United States Patent [19]

Bincoletto

[11] Patent Number: 4,700,092
[45] Date of Patent: Oct. 13, 1987

[54] ELECTRIC MOTOR LIQUID COOLING STRUCTURE

[75] Inventor: Ilario Bincoletto, San Doná di Piave, Italy

[73] Assignee: Lafert S.r.l., San Doná di Piave-Ve, Italy

[21] Appl. No.: 880,527

[22] Filed: Jun. 30, 1986

[30] Foreign Application Priority Data
Jul. 9, 1985 [IT] Italy ............................. 30738/85[U]

[51] Int. Cl.⁴ .................................................. F16C 13/02
[52] U.S. Cl. ....................................................... 310/54
[58] Field of Search ................. 310/52, 54, 58, 59, 310/64, 65, 90

[56] References Cited

U.S. PATENT DOCUMENTS

| | | | |
|---|---|---|---|
| 2,571,872 | 10/1951 | Hayes | 310/54 |
| 2,627,582 | 2/1953 | Hayes | 310/54 |
| 2,784,672 | 3/1957 | Wallace | 310/54 X |
| 2,862,120 | 11/1958 | Onsrud | 310/54 |
| 3,184,624 | 5/1965 | Soloman | 310/54 |
| 3,371,613 | 3/1968 | Dahlgren et al. | 310/54 X |
| 3,567,975 | 3/1971 | Biesack et al. | 310/54 |
| 3,597,645 | 8/1971 | Duffert et al. | 310/54 |
| 3,735,174 | 5/1973 | Bosch et al. | 310/54 X |
| 4,262,224 | 4/1981 | Kofink et al. | 310/54 |

Primary Examiner—Mark O. Budd
Attorney, Agent, or Firm—Guido Modiano; Albert Josif

[57] ABSTRACT

The electric motor structure comprises an outer containment box wherewith two heads are associable. The box has an annular chamber subdivided by a plurality of partition baffles adapted to impart a constrained path to the liquid, the head having radial chambers the closed end whereof is placed proximate to a seat for the motor shaft bearings. The radial and annular chambers communicate with each another, between the chambers there being provided means for sealing off said liquid, the annular chamber having at least one inlet conduit, and at least one outlet conduit for the cooling liquid.

9 Claims, 9 Drawing Figures

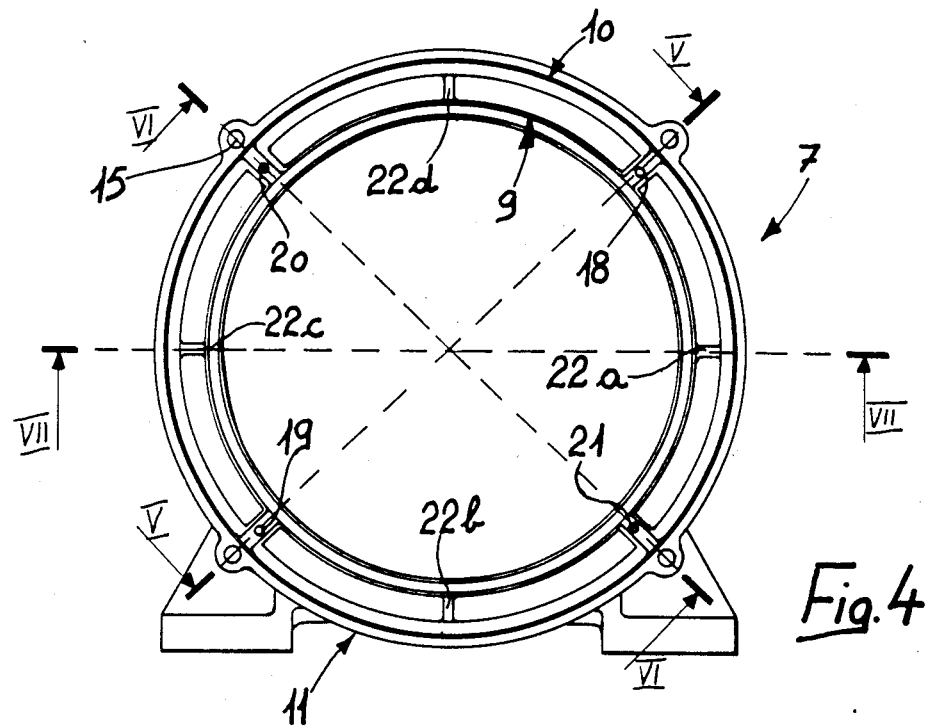
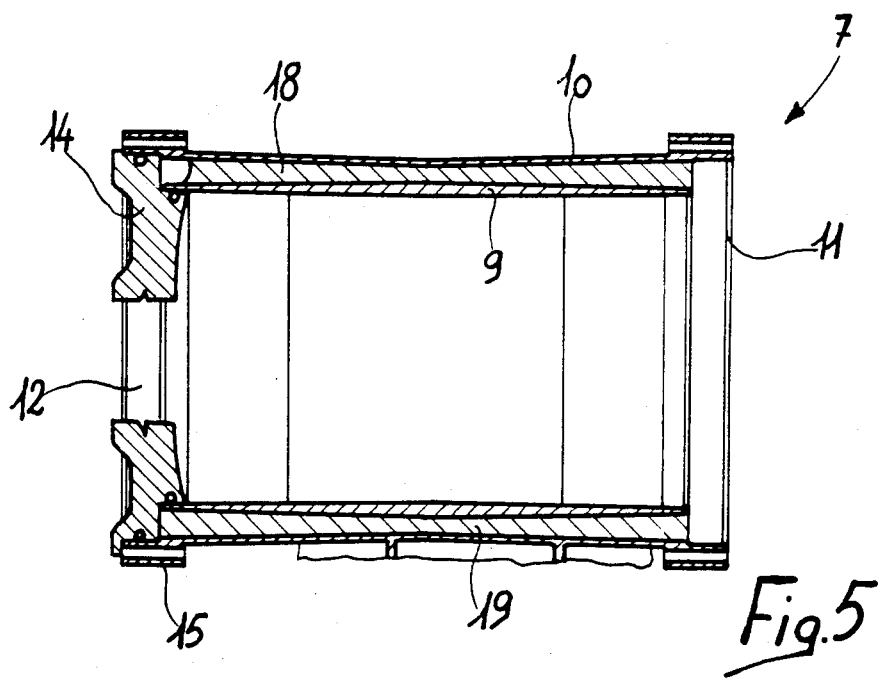

ELECTRIC MOTOR LIQUID COOLING STRUCTURE

BACKGROUND OF THE INVENTION

The present invention relates to an electric motor structure, particularly useful when an electric motor of the variable speed type is required or whenever it is necessary to lower the operating temperature of an electric motor.

In known types of electric motors, in fact, the ability to operate at variable speeds is usually achieved by varying, essentially, the characteristics of the voltage and/or load applied in accordance with the use to which the motor is to be put.

In such variable speed motors, however, a drawback is frequently encountered: there occurs in fact great heating, with the attendant serious problems of how to dissipate the heat so as to prevent overheating of the motor, which could result in serious damage thereto.

SUMMARY OF THE INVENTION

It is the principal aim of this invention therefore to overcome the above cited drawbacks of known types of electric motors, by devising an electric motor structure, which can be utilized at variable speeds without this implying overheating, of any parts thereof.

Within the above aim it is another important object of the invention to provide an electric motor structure which combines, with the preceding characteristic, that of affording fast dissipation of the heat without having to substantially vary the overall bulk of the motor.

A not least object is to provide an electric motor structure which is of moderate cost and can be readily made utilizing ordinary plant and equipment.

The above-cited aim and objects and other objects which will become apparent hereinafter, are achieved by an electric motor structure which is characterized in that it comprises an outer containing box-like case wherewith there are associable two heads, said box-like case having an annular chamber subdivided by a plurality of partitions adapted to define a costrained path for a fluid, said head including radial chambers the closed end whereof is located proximate the seat for the shaft bearings, said radial and annular chambers communicating with one another, there being provided therebetween fluid sealing means, the annular chamber having at least one inlet conduit and at least one outlet conduit for the cooling liquid.

BRIEF DESCRIPTION OF THE DRAWINGS

Further features and advantages of the invention will be more clearly apparent from the detailed description of a particular embodiment, shown by way of illustration in the accompanying drawing sheets where:

FIG. 4 shows a front view of the annular chamber;

FIG. 5 is a view taken along the section plane V—V of FIG. 4;

DESCRIPTION OF A PREFERRED EMBODIMENT

Figure 3:
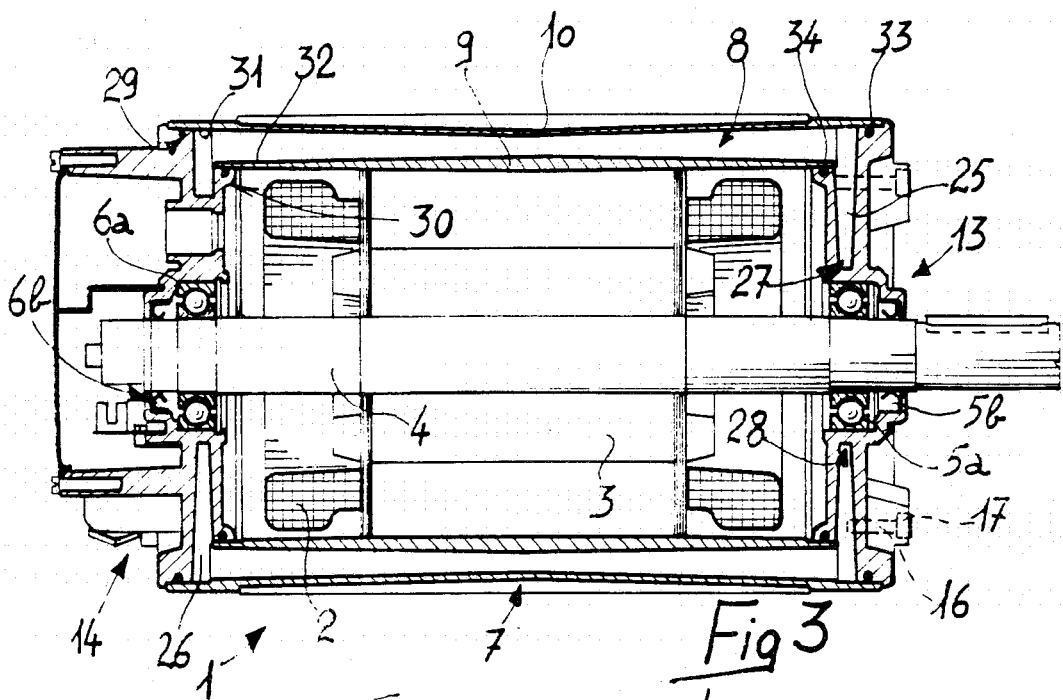
FIG. 3 is a view taken along the section plane III—III of FIG. 1.
Figure 1:
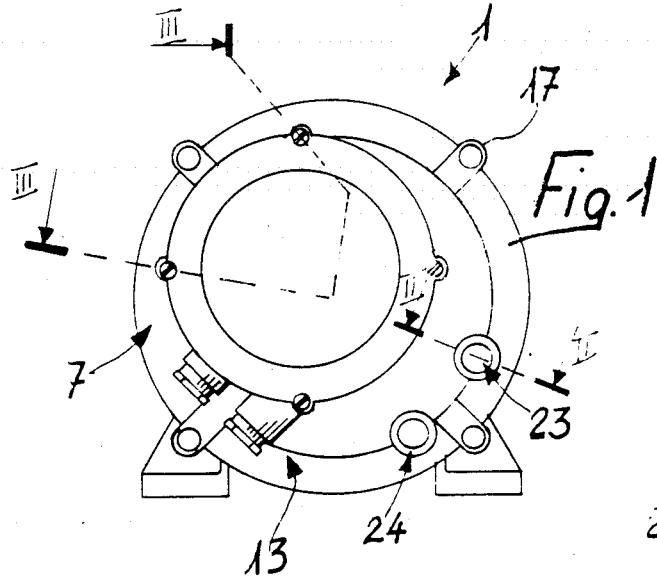
FIG. 1 shows a view of the head of the motor on which there are the cooling fluid inlet and outlet conduits.
Figure 2:
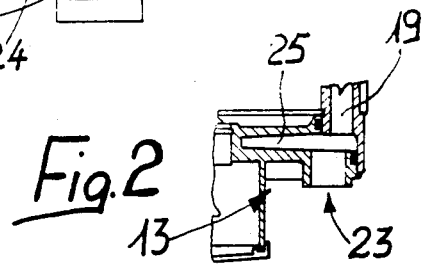
FIG. 2 is a view taken along the section plane II—II of FIG. 1.
Figure 6:
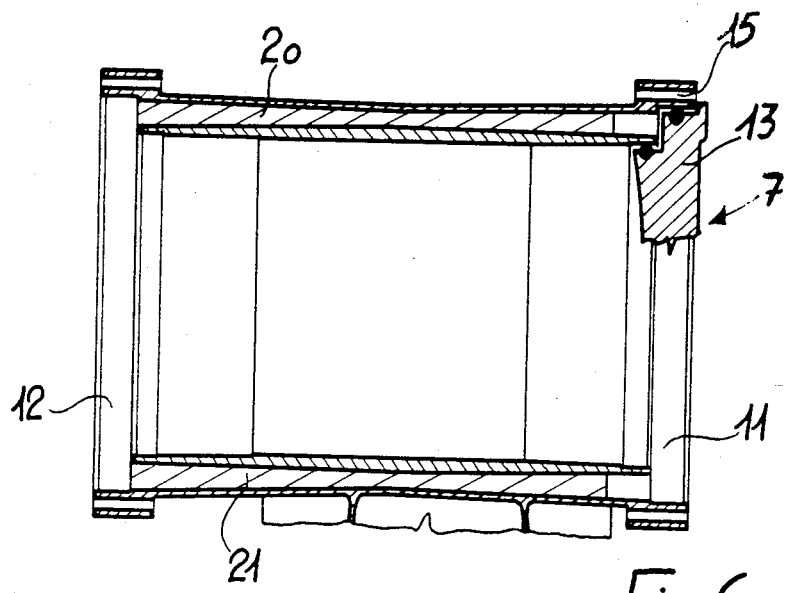
FIG. 6 is a view taken along the section plane VI—VI of FIG. 4.
Figure 7:
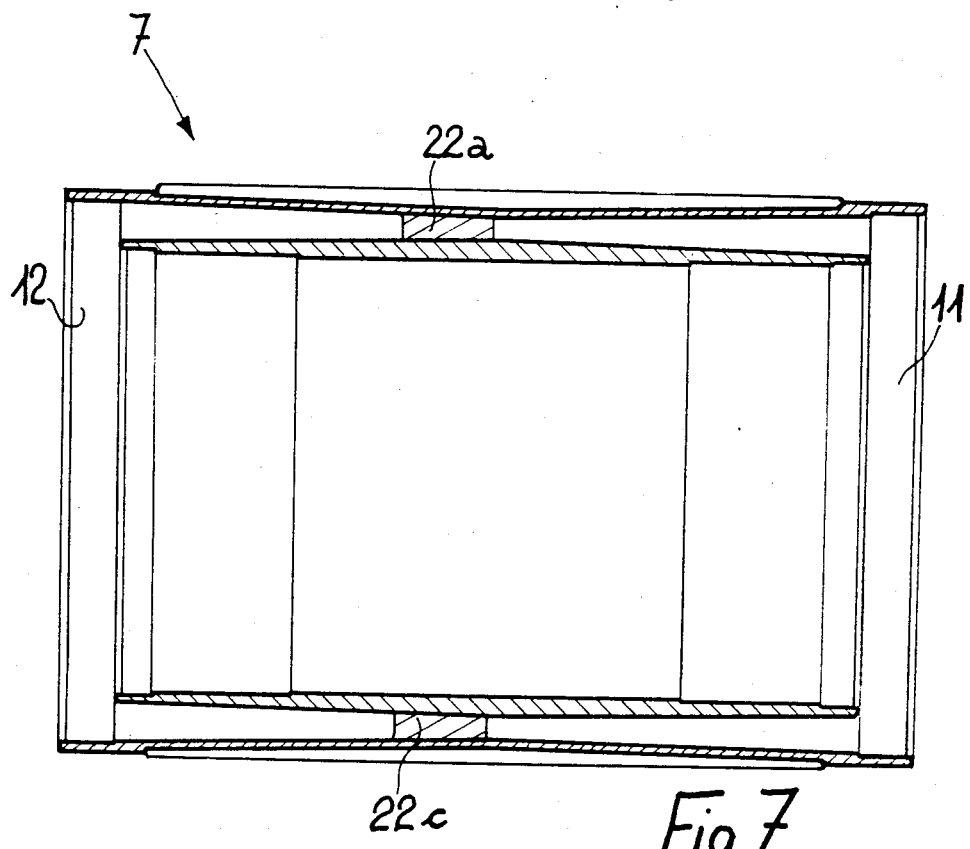
FIG. 7 is a view taken along the section plane VII—VII of FIG. 4.

With reference to the previously cited drawing figures, the electric motor structure 1 comprises a stator 2 and a rotor 3 with the shaft 4, wherewith there are associated bearings 5a and 6a, as well as appropriate sealing rings 5b and 6b, at the lateral ends. The stator-rotor assembly may be partly immersed in oil.

The motor 1 comprises moreover an outer box-like case or box 7 for containment of the stator 2 and rotor 3 assembly, said box 7 having an annular chamber 8 formed of two walls 9 and 10 expediently of cylindrical shape and being coaxial with each other; at the ends of same there are present two connection flanges 11 and 12 for heads indicated by the numerals 13 and 14, having pre-arranged openings for the ends of the shaft 4.

Both the flanges and the heads have pre-arranged seats 15 and 16 for means of mutual securement consisting, for example, of screws 17.

In the particular embodiment an overall number of four partitions or baffles are utilized, respectively indicated by the numerals 18,19,20,21 to which there are added four more spacer bridges 22a, 22b, 22c and 22d, all being preferably interspaced at regular intervals of 45°, though obviously, alternative numbers and relative angular positions of the baffles are possible.

The baffle 18 joins the walls 9 and 10 from the end of the box 7 having the flange 11 nearly as far as the proximities of the corresponding extremity of the flange 12.

The baffle 19 joins instead the walls 9 and 10 throughout their length, the head 13 having at the sides of the plane of lay of the baffle an inlet conduit 23 and an outlet one 24 for a cooling fluid or liquid.

The baffles 20 and 21 are advantageously analogous to the baffle 18, except that they join the walls 9 and 10 from the extremities of the flange 12 of the box 7 to the proximities of the corresponding extremities of the flange 11.

The spacer bridges 22a, 22b, 22c and 22d expediently join the walls 9 and 10 in a limited zone substantially at the transverse mid-plane of the walls , the adjoining bridges being placed on diametrical planes lying coplanar to one another, the baffles 18,19 and 20,21 advantageously being instead placed in pairs on the same diametrical plane, the two pairs of baffles being substantially coplanar with each other.

Each of the heads 13 and 14 has, respectively, a plurality of radial chambers 25 and 26 each communicating with an interspace of the annular chamber 8 formed by two adjoining baffles, the occluded ends 27 and 28 of said chambers being placed in the proximity of the bearings 5a and 6a.

At the peripheral edges of each head there are formed seats 29 and 30, facing the inner lateral surfaces 31 and 32 of the flanges 11 and 12, for accommodating sealing means adapted for sealing off the cooling liquid or fluid, said sealing means advantageously consisting of O-rings 33 and 34.

Figure 8:
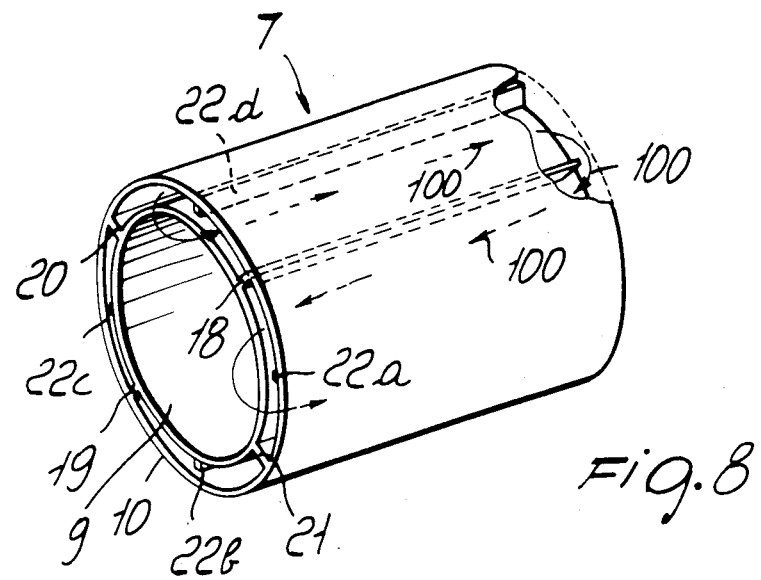
FIG. 8 is a fragmentary, partially cut-away perspective view of the outer box-like casing of the electric motor structure according to the invention.
Figure 9:
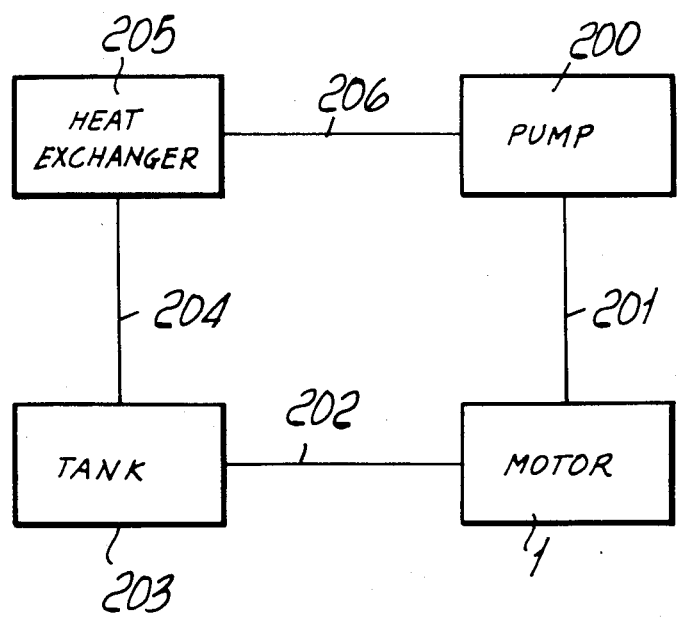
FIG. 9 schematically illustrates a cooling fluid circuit arrangement incorporating the inventive electric motor structure.

The utilization of the motor 1 contemplates that, in the steady state, there is forced, by means such as a pump 200 (FIG. 9), cooling liquid which passes from the pump into a pipe 201 and thereafter into the conduit 23; the liquid will travel through the annular chamber 8 following a costrained path due to the presence of the baffles 18,19,20 and 21, defining a back and forth meandering or winding path extending around the motor itself, as schematically illustrated by the arrows 100 in FIG. 8.

Thus, the liquid will flow down from one end to the other of the box 7, also by virtue of the presence of the sealing rings 33 and 34, sweeping across the wall 9 and penetrating the radial chambers 25 and 26 until it is ejected through the conduit 24.

It will be appreciated that the fluid, expelled through the conduit 24 of the head 13, will be heated by virtue of the thermal exchange occurring at the wall 9 as the fluid flows around the radial and annular chambers of the box-like casing 7, thus, heat generated by the motor, and in particular heat generated in the stator pack and bearings such as occurs in variable speed motors, is absorbed first, by the wall 9, and then by the fluid, which, accordingly, will undergo a degree of thermal expansion.

Accordingly, upon being forced out of the box-like case 7 through the conduit 24 by virtue of the action of the pump 200 the fluid, after passing through a connection pipe 202 enters a tank 203, where any expansion of the volume of the heated cooling fluid is accommodated.

From the tank 203 the fluid flows through an exchange conduit 204, to a radiator or heat exchanger 205, whereat the fluid is suitably cooled before being expelled through a heat exchanger outlet pipe 206, to flow back to the pump 200, whereat the cycle begins again.

Obviously, any suitable preferred type of pump and heat exchanger may be employed in the cooling circuit, according to requirements. It will be appreciated that even more than just one motor could be easily fed with cooling fluid and thus cooled in the manner described heretofore, whilst employing just one heat exchanger of suitable capacity, connected in forced fluid flow relationship with the motor units to be cooled.

Any heat generated, in particular by the stator pack and the bearings is dissipated by virtue of the fact that the wall 9 and the walls of the radial chambers are continuously cooled by the cooling liquid, the latter being composed of oil, water or any other suitable fluid.

It has been thus ascertained that the invention achieves all the objects set forth, the same allowing its use at variable speed without this implying heating problems, the overall structure being compact and not increasing the overall bulk by much.

Of course, the number of the baffles, their arrangement and the number and the position of the spacer bridges may be any ones, depending on demand, as may be the type of the cooling liquid employed and the means adapted to force the downflow inside the annular chamber.

What is claimed is:

1. An electric motor structure with forced liquid cooling comprising:

an outer box-like case including an outer wall of tubular shape, an internal wall of tubular shape surrounded by said outer wall at a distance, and first and second head bodies, said internal and outer walls delimiting between each other an annular chamber and having a longitudinal extension defining first and second box-like case ends, said head bodies being rigidly connected with said internal and outer walls at said box-like case ends, said head bodies and said internal wall delimiting together a motor chamber, a stator-rotor assembly sealingly accomodated in said motor chamber, said stator-rotor assembly including a rotatable motor shaft having motor shaft longitudinal ends protruding from said motor chamber at said head bodies, bearing means interposed between said head bodies and said protruding motor shaft longitudinal ends, seal means at said motor shaft longitudinal ends for sealingly closing said motor chamber, partition baffles extending in said annular chamber between said internal and said outer walls and defining a plurality of conduits in said annular chamber, a cooling system in said head bodies including a plurality of radial chambers having first radial chamber ends facing and in direct flow contact with said conduits and second radial chamber ends opposite to said first radial chamber ends and arranged near to said bearing means, said conduits and said radial chambers defining together a labyrinth path, a cooling fluid flowing in said labyrinth path, and inlet and outlet conduits in said box-like case connected to said labyrinth path.

2. An electric motor structure according to claim 1, wherein said outer and internal walls have a cylindrical shape and are arranged coaxially to each other.

3. An electric motor structure according to claim 1, comprising four said partition baffles arranged at 90° to each other along two mutually perpendicular planes.

4. An electric motor structure according to claim 1, wherein said radial chamber are physically separated from each other, each radial chamber being arranged between two adjacent partition baffles.

5. An electric motor structure according to claim 1, wherein said box-like case has a cylindrical shape and said partition baffles comprise a first partition baffle extending between said box-like case ends, a second partition baffle extending diametrically opposed with respect to said first partition baffle from said first box-like case end toward and at a distance from said second box-like case end, and third and fourth partition baffles extending mutually diametrically opposed between said first and second baffles from said second box-like case end toward and at a distance from said first box-like case end.

6. An electric motor structure according to claim 1, further comprising a plurality of spacer bridges extending in said annular chamber between said partition baffles at a middle portion between said first and second box-like case ends.

7. An electric motor structure according to claim 1, wherein said outer and internal walls have connection portion at said box-like case ends for rigid connection with said head bodies, said head bodies having sealing means facing said connection portions for sealing off said cooling fluid.

8. An electric motor structure with forced liquid cooling comprising:

a outer box-like case including an outer wall of cylindrical shape, an internal wall of cylindrical shape coaxially surrounded by said outer wall at a distance, and first and second head bodies, said internal and outer walls delimiting between each other an annular chamber and having a longitudinal extension defining first and second box-like case ends, said head bodies being rigidly connected with said internal and outer walls at said box-like case ends, said head bodies and said internal wall delimiting together a motor chamber, a stator-rotor assembly sealingly accomodated in said motor chamber, said stator-rotor assembly including a rotatable motor shaft having motor shaft longitudinal ends protruding from said motor chamber at said head bodies, bearing means interposed between said head bodies and said protruding motor shaft longitudinal ends, seal means at said motor shaft longitudinal ends for sealingly closing said motor chamber, partition baffles extending in said annular chamber between said internal and said outer walls and defining a plurality of conduits in said annular chamber, said partition baffles comprising a first partition baffle extending between said box-like case ends, a second partition baffle extending diametrically opposed with respect to said first partition baffle from said first box-like case end toward and at a distance from said second box-like case end, and third and fourth partition baffles extending mutually diametrically opposed between said first and second baffles from said second box-like case end toward and at a distance from said first box-like case end, a plurality of spacer bridges extending in said annular chamber between said partition baffles at a middle portion between said first and second box-like case ends, a cooling system in said head bodies including a plurality of radial chambers having first radial chamber ends facing and in direct flow contact with said conduits and second radial chamber ends opposite to said first radial chamber ends and arranged near to said bearing means, said conduits and said radial chambers defining together a labyrinth path, a cooling fluid flowing in said labyrinth path, and inlet and outlet conduits in said box-like case connected to said labyrinth path.

9. An electric motor structure according to claim 7, wherein said radial chamber are physically separated from each other, each radial chamber being arranged between two adjacent partition baffles.

* * * * *